United States Patent
Kresge et al.

[11] Patent Number: 5,902,767
[45] Date of Patent: May 11, 1999

[54] CATALYST HAVING AN ACIDIC SOLID OXIDE COMPONENT AND A GROUP IB METAL OR METAL OXIDE COMPONENT

[75] Inventors: Charles Theodore Kresge, West Chester, Pa.; Clarence D. Chang, Princeton, N.J.; Jose Guadalupe Santiesteban, Allentown, Pa.; David S. Shihabi, Pennington, N.J.; Scott Andrew Stevenson, Langhorne; James C. Vartuli, West Chester, both of Pa.

[73] Assignee: Mobil Oil Corporation, Fairfax, Va.

[21] Appl. No.: 09/195,258

[22] Filed: Nov. 18, 1998

Related U.S. Application Data

[63] Continuation-in-part of application No. 08/689,446, Aug. 12, 1996, which is a continuation-in-part of application No. 08/410,156, Mar. 24, 1996, Pat. No. 5,552,128, which is a continuation-in-part of application No. 08/100,940, Aug. 3, 1993, Pat. No. 5,401,478.

[51] Int. Cl.[6] .............................. B01J 23/00; B01J 23/58; B01J 23/72

[52] U.S. Cl. .................. 502/308; 502/317; 502/318; 502/324; 502/326; 502/330; 502/331; 502/344; 502/345; 502/349; 502/350

[58] Field of Search ..................................... 502/308, 309, 502/318, 345, 347, 350, 317, 344, 349, 324, 325, 326, 330, 331

[56] References Cited

U.S. PATENT DOCUMENTS

| | | | |
|---|---|---|---|
| 5,113,034 | 5/1992 | Soled et al. | 585/510 |
| 5,198,403 | 3/1993 | Brand et al. | 502/309 |
| 5,345,026 | 9/1994 | Chang et al. | 585/700 |

*Primary Examiner*—Glenn Caldarola
*Assistant Examiner*—In Suk Bullock
*Attorney, Agent, or Firm*—Penny L. Prater; Malcolm D. Keen

[57] ABSTRACT

This invention is directed to a catalyst that comprises (i) an acidic solid oxide component comprising an oxide of a Group IVB metal modified with an anion or oxyanion of a Group VIB metal, and (ii) a Group IB metal or metal oxide component. This catalyst may be used, for example, to isomerize paraffins.

10 Claims, 4 Drawing Sheets

CATALYST HAVING AN ACIDIC SOLID OXIDE COMPONENT AND A GROUP IB METAL OR METAL OXIDE COMPONENT

CROSS REFERENCE TO RELATED APPLICATION

This application is continuation-in-part application of co-pending Ser. No. 08/689,446, filed Aug. 12, 1996, (filed under 37 CFR 1.53 (b)), which is a continuation-in-part application of U.S. patent application Ser. No. 08/410,156 filed on Mar. 24, 1995 (which issued as U.S. Pat. No. 5,552,128 on Sep. 30, 1996), which is a continuation-in-part application of U.S. patent application Ser. No. 08/100,940 filed on Aug. 3, 1993 (which issued as U.S. Pat. No. 5,401,478 on Mar. 28, 1995).

FIELD OF THE INVENTION

This invention is directed to a catalyst that comprises (i) an acidic solid oxide component comprising an oxide of a Group IVB metal modified with an anion or oxyanion of a Group VIB metal, and (ii) a Group IB metal or an oxide of a Group IB metal. This catalyst may be used, for example, to isomerize paraffins.

BACKGROUND OF THE INVENTION

A superacid is a known class of acidic material that has an acid strength, measured by Hammett acidity function $H_0$, greater than that of 100% $H_2SO_4$, which has an $H_0$ value of $-12$. A superacid, therefore, has an $H_0$ value of less than $-12$ or an acid strength greater than $-12$. Superacids are useful for reactions that are generally catalyzed by strong acid, such as paraffin isomerization.

M. Hino and K. Arata describe the synthesis of a solid superacid having an acid strength of up to $H_0 \leq -16.04$ by exposing hydroxides or oxides of Fe, Ti, Zr and Hf, prior to crystallization, to sulfate ions, followed by calcination in air at over 500° C. in *J. Chem. Soc., Chem. Commun.*, 1148 (1979). K. Arata and M. Hino also describe the synthesis of a solid superacid having an acid strength of $H_0 \leq -14.52$ by impregnating $Zr(OH)_4$ or amorphous $ZrO_2$ with aqueous ammonium metatungstate, followed by calcining in air at 800° to 850° C. in *J. Chem. Soc., Chem. Commun.*, 1259 (1988) and in "Synthesis of Solid Superacid of Tungsten Oxide Supported on Zirconia and Its Catalytic Action", *Proceedings 9th International Congress on Catalysis*, Volume 4, pages 1727–1734 (1988).

The superacid described by K. Arata and M. Hino in "Synthesis of Solid Superacid of Tungsten Oxide Supported on Zirconia and Its Catalytic Action" is particularly useful as a catalyst in the isomerization of butane to isobutane and of pentane to isopentane. However, in order to obtain maximum catalytic activity, K. Arata and M. Hino report calcination temperatures of from 800° to 850° C. for the tungsten-modified zirconia catalyst.

Soled et al describe, in U.S. Pat. No. 5,113,034, a solid acid catalyst having an $H_0$ value ranging from $-14.5$ to about $-16.5$, comprising a sulfate or tungstate-modified Group IVB oxide, which is useful to dimerize $C_3$ or $C_4$ containing feedstreams. A calcination temperature range for the tungstate-modified zirconia catalyst of 450° to 800° C. is given. Specifically, the Examples use an initial calcination temperature of 600° C., followed by a calcination temperature of 800° C. prior to charging.

U.S. Pat. No. 5,198,403 (Brand et al, herinafter Brand) discloses a catalyst for the selective reduction of nitrous oxide with ammonia which contains, in addition to titanium oxide as component A, at least one oxide of tungsten, silicon, boron, aluminum, phosphorus, zerconium, barium, yttrium, lanthanum, cerium as component B1 and at least one oxide of vanadium, niobium, molybdenum, iron and copper as B2, with an atomic ratio between the elements of components A and B from 1:0.001 up to 1. The catalyst of Brand requires the presence of titanium oxides, presumably because it is effective in the reduction of nitrous oxides. Reduction of nitrous oxides is the intended purpose of Brand. The catalysts of the instant invention do not contain titanium and are not drawn to nitrous oxide reduction.

U.S. Pat. No. 4,918,041 (Hollstein et al, hereinafter Hollstein) is directed to a sulfated calcined solid catalyst. The catalysts of the instant invention are not sulfated. Group VI B metals such as tungsten are employed in the superacid, rather than Group VI A metals such as sulfur. Group VI B metals are preferred in the instant invention due to their stability and ease in regeneration.

The generation of acid activity in solid oxide catalysts in general, and in the tungsten-modified zirconia catalyst specifically, requires calcination of the catalyst at temperatures of about 800° C. This extreme temperature, however, causes significant loss of catalyst surface area. For example, K. Arata and M. Hino report surface areas of 35.3 and 29.5 $m^2/g$ for catalysts calcined at 800° and 900° C. in "Synthesis of Solid Superacid of Tungsten Oxide Supported on Zirconia and Its Catalytic Action". By contrast, the surface areas for catalysts calcined at 600° and 700° C. are reported as 44.2 and 38.5 $m^2/g$. Hence, it is clear that as the calcination temperature is increased, the surface area of the catalyst is decreased. Further, the extreme calcination temperature required to generate acid activity results in a more difficult manufacturing process.

SUMMARY OF THE INVENTION

The incorporation of small amounts of a Group IB metal or an oxide of a Group IB metal with an acidic solid oxide component has been found to reduce the calcination temperature required for the generation of acid sites in a catalyst by about 200° C. or more. For example, the calcination temperature in the case of a tungsten-modified zirconia catalyst is reduced to about 600° C. for paraffin isomerization with the incorporation of a small amount of copper. Hence, the acid activity of a catalyst can be maximized at lower calcination temperatures, without reducing its surface area.

Specifically, this invention is directed to a catalyst that comprises (i) an acidic solid oxide component comprising an oxide of a Group IVB metal modified with an anion or oxyanion of a Group VIB metal, and (ii) a Group IB metal or an oxide of a Group IB metal.

The present invention is also directed to a method for preparing such a atalyst and a method for converting organic compounds using the catalyst of the invention.

DETAILED DESCRIPTION OF THE INVENTION

The Catalyst

The catalyst of the present invention comprises (i) an acidic solid oxide component comprising an oxide of a Group IVB metal modified with an anion or oxyanion of a Group VIB metal, and (ii) a Group IB metal or an oxide of a Group IB metal.

The modification of the Group IVB metal oxide with the anion or oxyanion of the Group VIB metal imparts acid functionality to the acidic solid oxide component. The modification of a Group IVB metal oxide, particularly zirconia, with a Group VIB metal anion or oxyanion, particularly tungstate, is described by K. Arata and M. Hino in the aforementioned article, "Synthesis of Solid Superacid of Tungsten Oxide Supported on Zirconia and Its Catalytic Action".

The Group IVB metal oxide modified with an anion or oxyanion of a Group VIB metal is believed to result from an actual chemical interaction between the Group IVB metal oxide and the Group VIB metal anion or oxyanion. This chemical interaction is discussed in the aforementioned article by K. Arata and M. Hino, with respect to the formation of a solid superacid when sulfate ions are reacted with hydroxides or oxides of certain metals, such as zirconium. These superacids are said to have the structure of a bidentate sulfate ion coordinated to the metal. In the article, it is further disclosed that a superacid can also be formed when tungstate is reacted with a hydroxide precipitate of zirconium. The resulting tungstate-modified zirconia material is theorized to have an analogous structure to the aforementioned superacid comprising sulfate and zirconium, wherein tungsten atoms replace sulfur atoms in the bidentate structure. However, as noted by K. Arata and M. Hino, the tungstate-modified zirconia material is more stable and much easier to regenerate than the sulfated superacid catalyst, since the tungstate-modified zirconia material does not contain sulfate ions, which may be eliminated under certain reactions and conditions.

Although it is believed that the acidic solid oxide component may comprise the bidentate structure suggested in the aforementioned article by K. Arata and M. Hino, the particular structure of the catalytically active site in the Group IVB metal oxide modified with an anion or oxyanion of a Group VIB metal has not yet been confirmed. Therefore, it is not intended that the acidic solid oxide component be limited to any particular structure.

The Group IVB metal of the acidic solid oxide component may be zirconium, titanium or hafnium and the Group VIB metal may be tungsten, molybdenum or chromium. Preferably, the Group IVB metal is zirconium or titanium and the Group VIB metal is tungsten or molybdenum. The Group IVB and Group VIB metal species of the acidic solid oxide component are not limited to any particular valence state, and may be present in any positive oxidation state.

Suitable sources of the Group IVB metal oxide include salt solutions, such as oxychloride, chloride, or nitrate, etc., particularly of zirconium or titanium. The salt solution is preferably water soluble and capable of forming a hydroxide precipitate upon addition of a base, such as ammonium hydroxide or alkylammonium hydroxide. Alkoxides may also be used as precursors or sources of the Group IVB metal oxide, which may be hydrolyzed with water to form the hydroxide precipitate. Examples of such alkoxides include zirconium n-propoxide and titanium i-propoxide.

Suitable sources for the anion or oxyanion of the Group VIB metal, such as tungstate or molybdate, include but are not limited to ammonium metatungstate or metamolybdate, tungsten or molybdenum chloride, tungsten or molybdenum carbonyl, tungstic or molybdic acid, and sodium tungstate or molybdate. Tungstate is the preferred Group VIB metal anion or oxyanion.

Elemental analysis of the acidic solid oxide component will reveal the presence of a Group IVB metal, a Group VIB metal and oxygen. The amount of oxygen measured in such an analysis will depend on a number of factors, such as the valence state of the Group IVB and Group VIB metals, and the moisture content, etc. Accordingly, in characterizing the composition of the acidic solid oxide component, it is best not to be restricted by any particular quantities of oxygen. In functional terms, the amount of Group VIB metal anion or oxyanion in the acidic solid oxide component may be expressed as that amount which increases the acidity of the Group IVB metal oxide. This amount is referred to herein as an acidity increasing amount. Elemental analysis of the acidic solid oxide component may be used to determine the relative amounts of Group IVB metal and Group VIB metal in the catalyst. From these amounts, the molar ratio $XO_2/YO_3$ may be calculated, where X is the Group IVB metal (assumed to be in the form $XO_2$) and Y is the Group VIB metal (assumed to be in the form of $YO_3$). However, these forms of oxides, e.g., $XO_2$ and $YO_3$, may not actually exist, and are referred to herein simply for the purpose of calculating relative quantities of the Group IVB and Group VIB metals in the acidic solid oxide component. The acidic solid oxide component may have calculated molar ratios, expressed in the form of $XO_2/Y_3$, of up to 1000, e.g., up to 300, e.g., from 2 to 100, e.g., from 4 to 30.

The Group IB metal may be copper or silver. Suitable sources for the Group IB metal or the oxide of a Group IB metal include copper sulfate, nitrate, acetate, halide or alkoxide. The atomic ratio of Group IB metal to zirconium in the acidic solid oxide component may be from about 0.0001 to 0.5, and preferably from about 0.01 to 0.3.

A second embodiment of the catalyst includes an iron and/or manganese component therein. Suitable sources for the iron and/or manganese components include iron halide, sulfate or nitrate and manganese nitrate, acetate, halide or carbonate.

The amount of iron and/or manganese that is incorporated into the present catalyst may be expressed in terms of calculated molar ratios of oxides, based upon the elemental analysis of the acidic solid oxide component for the Group IVB metal, X, along with Fe and Mn. More particularly, the catalyst may have a calculated molar ratio, expressed in terms of $XO_2/(Fe_2O_3+MnO_2)$, of, for example, from 10 to 5000. It will be appreciated, however, that Fe need not be in the form of $Fe_2O_3$ and Mn need not be in the form of $MnO_2$. More particularly, at least a portion of these components may be in the form of free metals or other combined forms than $Fe_2O_3$ or $MnO_2$, e.g., as salts with elements other than oxygen, in any possible valence state for X, Fe or Mn. Accordingly, the expression, $XO_2/(Fe_2O_3+MnO_2)$, is given merely for the purpose of expressing calculated quantities of X, Fe and Mn, and is not to be construed as being limited of the actual form of these elements in the present catalyst.

In a third embodiment of the catalyst, it may be desirable to combine a hydrogenation/dehydrogenation component therewith. The hydrogenation/dehydrogenation component may be derived from Group VIII metals, such as platinum, iridium, osmium, palladium, rhodium, ruthenium, nickel, cobalt, iron and mixtures of two or more thereof. These components may be mixed with components derived from Group IVA metals, preferably Sn, and/or components derived from Group VIIB metals, preferably rhenium and manganese. Salts containing these metals may be used as a source for the hydrogenation/dehydrogenation component. The metal-containing salt is preferably water soluble. Examples of such salts include chloroplatinic acid, tetraamineplatinum complexes, platinum chloride, tin sulfate and tin chloride.

The amount of the hydrogenation/dehydrogenation component may be that amount which imparts or increases the catalytic ability of the catalyst to hydrogenate or dehydrogenate an organic compound, under sufficient hydrogenation or dehydrogenation conditions. This amount is referred to herein as a catalytic amount. Quantitatively speaking, the catalyst may comprise, for example, from about 0.001 to 5 wt. %, e.g., from about 0.01 to 1.0 wt. %, of the hydrogenation/dehydrogenation component, based on the total weight of the catalyst, especially when this component is a noble metal.

Other elements, such as Group IA alkali or Group IIA alkaline earth compounds, may be added to the catalyst to alter catalytic properties. The addition of such alkali or alkaline earth compounds to the catalyst may enhance the catalytic properties of components thereof, e.g., Pt or W, in terms of their ability to function as a hydrogenation/dehydrogenationcomponent or an acid component.

Higher isomerization activity may be provided by the inclusion of an additional material having Lewis or Bronsted acid activity in the catalyst, especially when the catalyst comprises a porous binder material. For this purpose, both liquid and solid acid materials may be used. Examples of suitable additional acidic materials include aluminum trichloride, boron trifluoride and complexes of boron trifluoride, for example, with water, lower alcohols or esters.

Preparation of the Catalyst

The catalyst of the present invention may be prepared, for example, by combining a first liquid solution comprising a source of a Group IVB metal oxide, a second liquid solution comprising a source of an anion or oxyanion of a Group VIB metal, and a third liquid solution comprising a source of Group IB metal or metal oxide, under conditions sufficient to cause precipitation of the catalyst, from the liquid solution. The source of the Group IVB metal oxide, the source of the anion or oxyanion of the Group VIB metal and the source of Group IB metal or metal oxide may also be combined in a single liquid solution. This solution may then be subjected to conditions sufficient to cause precipitation of the catalyst, such as by the addition of a precipitating reagent to the solution. Examples of the precipitating reagent include ammonium hydroxide and alkylammonium hydroxide. Water is a preferred solvent for these solutions.

The temperature at which the liquid solution is maintained during precipitation may be less than about 200° C., e.g., from about 0° to 200° C. This liquid solution may be maintained at an ambient temperature (e.g., room temperature), or may be cooled or heated. A particular range of such temperatures is from about 50° to 100° C.

The liquid solution from which the present catalyst is precipitated may optionally comprise a solid support material, in which case the present catalyst may be precipitated directly onto the solid support material. Examples of such support materials include the material designated M41S, which is described in U.S. Pat. No. 5,102,643. A particular example of such an M41S material is a material designated MCM-41, which is described in U.S. Pat. No. 5,098,684. The iron and/or manganese component and co-catalyst materials may also be co-precipitated from the liquid solution, along with the Group IVB metal oxide, the anion or oxyanion of the Group VIB metal and the Group IB metal or metal oxide. An example of a co-catalyst material is the hydrogenation/dehydrogenation component.

The catalyst may be recovered from the liquid solution by filtration, followed by drying. The catalyst may be subjected to a final calcination as described below to dehydrate the catalyst and to confer the required mechanical strength on the catalyst.

A second embodiment for preparing the present catalyst comprises the steps of (i) precipitating a hydroxide precipitate of a Group IVB metal, such as $Zr(OH)_4$; (ii) drying the material of step (i) at a temperature of about 95° C. or less, e.g., about 30° to 95° C.; (iii) contacting the dried hydroxide precipitate of the Group IVB metal with an aqueous solution comprising a source of an anion or oxyanion of a Group IVB metal, under conditions sufficient to form a solid material comprising Group IVB metal, Group VIB metal and oxygen; and (iv) contacting the material of step (iii) with a source of Group IB metal or metal oxide;

As suggested in the aforementioned article by K. Arata and M. Hino in "Synthesis of Solid Superacid of Tungsten Oxide Supported on Zirconia and Its Catalytic Action", precalcination of $Zr(OH)_4$ at a temperature of from about 100° to 400° C. results in a zirconia species that interacts more favorably with tungstate, than that obtained using a precalcination temperature of greater than 400° C. This precalcination is believed to result in the condensation of ZrOH groups to form a polymeric zirconia species with surface hydroxyl groups, which is referred to herein as a hydrated oxide, specifically, a hydrated oxide of zirconium. The expression, hydrated oxide, is intended to connote a material comprising atoms of a Group IVB metal covalently linked to other atoms of a Group IVB metal via bridging oxygen atoms, e.g., Zr—O—Zr, further comprising surface hydroxy groups. These available surface hydroxyl groups are believed to react with the anion or oxyanion of the Group VIB metal, such as tungstate, to form the acidic solid oxide component.

Therefore, a third embodiment for preparing the present catalyst comprises (i) calcining a hydroxide precipitate, such as $Zr(OH)_4$, at a temperature from about 100° to 400° C. to obtain a hydrated oxide of a Group IVB metal; (ii) contacting the hydrated oxide of the Group IVB metal with an aqueous solution comprising a source of an anion or oxyanion of a Group IVB metal, under conditions sufficient to form a solid material comprising Group IVB metal, Group VIB metal and oxygen; and (iii) combining the solid material of step (ii) with a source of Group IB metal or metal oxide.

Treatment of the hydroxide precipitate or hydrated oxide under hydrothermal conditions prior to contact with the source of the Group VIB metal anion or oxyanion, such as tungstate, is also beneficial. More particularly, refluxing the hydroxide precipitate or hydrated oxide in a liquid medium having a pH of about 7 to 14 is beneficial. Without wishing to be bound by any theory, it is theorized that the hydrothermally treated hydroxide precipitate or hydrated oxide has a higher surface area. It is also theoretically possible that the hydrothermal treatment alters surface hydroxyl groups on the hydroxide precipitate or hydrated oxide, possibly in a manner that promotes a more desirable interaction with tungstate later used.

The hydrothermal conditions may include a temperature of from about 50° to 200° C., e.g., about 80° C., e.g., about 100° C. The hydrothermal treatment may take place in a sealed vessel at greater than atmospheric pressure, up to about 3450 kPa (about 500 psi). However, a preferred mode of treatment involves the use of an open vessel under reflux conditions. Agitation of the hydroxide precipitate or hydrated oxide in a liquid medium, e.g., by the action of refluxing liquid and/or stirring, promotes the effective interaction of the hydroxide precipitate or hydrated oxide with the liquid medium. The duration of the contact of the hydroxide precipitate or hydrated oxide with the liquid medium may be at least 1 hour, e.g., at least 8 hours, up to about 72 hours. The liquid medium for this treatment may have a pH of about 7 to 14, e.g., about 9. Suitable liquid mediums include water, hydroxide solutions (including hydroxides of $NH_4^+$, $Na^+$, $K^+$, $Mg^{2+}$, and $Ca^{2+}$), carbonate and bicarbonate solutions (including carbonates and bicarbonates of $NH_4^+$, $Na^+$, $K^+$, $Mg^{2+}$, and $Ca^{2+}$), pyridine and its derivatives, and alkyl/hydroxyl amines.

Accordingly, a fourth embodiment for preparing the present catalyst includes the steps of (i) hydrothermally treating a hydroxide precipitate of a Group IVB metal with a liquid medium having a pH of about 7 or greater; (ii) impregnating the hydrothermally treated material of step (i) with an aqueous solution containing an anion or oxyanion of the Group VIB metal, preferably tungstate or molybdate; and (iii) contacting the material of step (ii) with a source of Group IB metal or metal oxide.

A fifth embodiment for preparing the present catalyst includes the steps of (i) calcining a hydroxide precipitate, such as $Zr(OH)_4$, at a temperature from about 100° to 400° C. to obtain a hydrated oxide of a Group IVB metal; (ii) hydrothermally treating the hydrated oxide of the Group IVB metal with a liquid medium having a pH of about 7 or greater; (iii) impregnating the hydrothermally treated hydrated oxide of the Group IVB metal with an aqueous solution containing an anion or oxyanion of the Group VIB metal, preferably tungstate or molybdate; and (iv) contacting the material of step (iii) with a source of Group IB metal or metal oxide.

In the second, third, fourth and fifth embodiments for preparing the present catalyst, the hydrogenation/dehydrogenation component of the catalyst may be added before or after calcination, by techniques known in the art, such as ion exchange, impregnation, coprecipitation, physical admixture, etc. The hydrogenation/dehydrogenation component may also be combined with the catalyst components before or after the catalyst components are combined with a matrix material or binder, as discussed below.

The iron and manganese components be added in the second, third, fourth and fifth embodiments at any time by techniques known in the art.

Calcination of the catalyst may be carried out, preferably in an oxidizing atmosphere, at about atmospheric pressure to 6890 kPa (about 1000 psi); and at temperatures from about 500° to 800° C., e.g., from about 600° to 700° C. More particularly, the catalyst may be calcined at a temperature of about 600° to 700° C. for paraffin isomerization. The calcination time may be up to 48 hours, e.g., for about 0.5 to 24 hours, e.g., for about 1.0 to 10 hours.

The present catalyst may be shaped into a wide variety of particle sizes. Generally speaking, the particles may be in the form of a powder, granules, or a molded product, such as an extrudate having a particle size sufficient to pass through a 2 mesh (Tyler) screen and to be retained on a 400 mesh (Tyler) screen. In cases where the catalyst is molded, the catalyst may be extruded before drying or partially dried and then extruded.

The catalyst may also be composited with a matrix material or binder using conventional matrix materials, such as alumina, silica-alumina and silica. Other matrix materials, such as titania, zirconia and other metal oxides, molecular sieves, and clay, may also be used. The weight ratio of active catalyst to matrix material may be from 90:10 to 10:90, e.g., from 80:20 to 50:50. The catalyst may be composited with the matrix material by conventional means, such as mulling the components together, followed by extrusion.

When a source of hydrogenation metal, such as $H_2PtCl_6$, is used as a source of a hydrogenation/dehydrogenation component in the present catalyst, it may be desirable to subject the catalyst to extended reducing conditions. In particular, the catalyst of the present invention may be contacted with hydrogen at elevated temperatures. These elevated temperatures may be from about 100° to 500° C., e.g., about 250° C., e.g., about 300° C., at atmospheric pressure. The duration of this contact may be as short as one hour or even 0.1 hour. However, extended contact may also be used. This extended contact may take place for a period of 6 hours or greater, e.g., about 18 hours. The catalyst may be contacted with hydrogen in the presence or absence of a hydrocarbon feed. For example, the activity of the catalyst may be increased, in situ, during the course of a reaction when a hydrocarbon feed and hydrogen are passed over the catalyst at elevated temperatures, where the hydrogen $H_2$ to hydrocarbon HC molar ratio is about 0.1:1 to about 10:1.

Use of the Catalyst

The isomerization of paraffins, especially light paraffins, is an established refining process that is used to provide additional feedstock for alkylation units or to convert relatively low octane, linear paraffins to higher octane, branched chain isomers, that can be blended into the gasoline pool.

In the present isomerization process, n-paraffinic and mono-methyl branched paraffinic components are isomerized to higher branched paraffins, which generally have higher octane numbers. By way of illustration, the significance of these reactions can be gleaned from a review of the following table of Octane Numbers of Pure Hydrocarbons from P. H. Emmett, ed., *Catalysis*, Vol. VI (1958).

Octane Numbers of Pure Hydrocarbons

| Hydrocarbon Paraffins: | Blending Research Octane Number (clear) |
| --- | --- |
| n-heptane | 0 |
| 2-methylhexane | 41 |
| 3-methylhexane | 56 |
| 2,2-dimethylpentane | 89 |
| 2,3-dimethylpentane | 87 |
| 2,2,3-trimethylbutane | 113 |

The catalyst described herein may be used to isomerize $C_4$ to $C_8$ paraffins, either as pure compounds or mixtures. For example, the feedstock may be one that which contains significant amounts of $C_5^+$ normal and/or slightly branched paraffins. In addition, the feedstock may contain monocyclic aromatic compounds and/or cyclic paraffins, such as cyclohexane and $C_6^+$ naphthas, which may undergo ring opening reactions in the presence of the catalyst to form paraffins that may be isomerized to iso-paraffins. Among the hydrocarbons having 6 or less carbon atoms in the feedstock, at least 1 wt. %, e.g., at least 5 wt. %, e.g., at least 10 wt. %, e.g., at least 20 wt. %, e.g., at least 30 wt. %, of these hydrocarbons may be cyclic hydrocarbons, e.g., aromatics or cyclic paraffins. Mixed paraffin-olefin feeds containing significant levels of olefin may be utilized.

The present isomerization process may be carried out by contacting the hydrocarbon feed in either liquid or gas phase with the solid catalyst at temperatures in the range of about 90° to 425° C. (about 200° to 800° F.); temperatures outside this range may be utilized although they are normally less preferred; temperatures from about 150° to 370° C. (about 300° to 700° F.) are typical. Pressures will normally be up to about 7,000 kPa (about 1000 psi), although there is no reason why higher pressures should not be utilized. Lower pressures, in the range of about 345 to 4150 kPa (about 50 to 600 psi) may be readily employed and the use of relatively low pressures within this range will generally be preferred in order to permit the use of low pressure equipment. The isomerization process may be carried out either in the presence or absence of hydrogen, more preferably in the presence of hydrogen. The molar ratio of hydrogen to hydrocarbon is preferably in the range of 0.1:1 to 10:1 and usually from 0.5:1 to 2:1. Space velocities are typically from 0.1 to 10 LHSV and usually from 0.5 to 5 LHSV. When an additional acidic material (Lewis acid or Bronsted acid) is included in the catalyst, lower operational temperatures may be used, favoring isomerization over the less desired cracking reactions.

EXAMPLES

Example 1

Five hundred grams of $ZrOCl_2 \cdot 8H_2O$ dissolved with stirring in 7 liters of distilled water. A solution containing 263 grams of concentrated $NH_4OH$, 500 ml of distilled $H_2O$, and 54 grams of $(NH_4)_6H_2W_{12}O_{40} \cdot xH_2O$ was added dropwise over a 30–45 minute period. The pH of the final composite was adjusted to approximately 9 by the addition of concentrated ammonium hydroxide. The synthesis composition, in terms of the Zr/W molar ratio, was 7.1/1. This slurry was then put in polypropylene bottles and placed in a steambox (100° C.) for 72 hours. The product formed was recovered by filtration, washed with excess water, and dried overnight at 85° C. A sample of this catalyst was calcined at 830° C. in flowing air for 3 hours. The chemical analyses of the calcined material were: W, 16.6% (by weight); Zr, 64.9%; balance, oxygen; Ash (1000° C.), 100%. The surface area was 62 $m^2/g$.

Example 2

A catalyst was prepared as described in Example 1. Samples of this catalyst were calcined at 700° C. and at 830° C. in flowing air for 3 hours. The chemical analyses of the 830° C. calcined material were: W, 15.4% (by weight); Zr, 66.5%; balance, oxygen; Ash (1000° C.), 97.9%. The surface area after calcination at 830° C. was 63 $m^2/g$.

Example 3

Five hundred grams of $ZrOCl_2 \cdot 8H_2O$ were dissolved with stirring in 6.5 liters of distilled water. To the zirconyl chloride solution a mixture of 6.7 grams of $CuSO_4 \cdot 5H_2O$ dissolved in 500 ml of distilled water and another mixture of 54 grams of $(NH_4)_6H_2W_{12}O_{40} \cdot xH_2O$ dissolved in 500 ml of distilled water were added. A solution containing 263 grams of concentrated $NH_4OH$ and 500 ml of distilled $H_2O$ was added dropwise over a 30–45 minute period. The pH of the final composite was adjusted to approximately 9 by the addition of concentrated ammonium hydroxide. The synthesis composition, in terms of the Zr/W/Cu atomic or molar ratios, was 7.1/1/0.12. This slurry was then put in polypropylene bottles and placed in a steambox (100° C.) for 72 hours. The product formed was recovered by filtration, washed with excess water, and dried overnight at 85° C. Samples of this catalyst were calcined at 500, 600, 650, 700, and 830° C. in flowing air for 3 hours; the surface areas of the various calcined samples were 316; 183; 107; 102; 97; and 10 $m^2/g$, respectively. The chemical analyses of the 830° C. calcined material were: Cu, 0.73% (by weight); W, 16.2%; Zr, 57.4%: balance, oxygen; Ash (1000° C.), 99.4%.

Example 4

Five hundred grams of $ZrOCl_2 \cdot 8H_2O$ were dissolved with stirring in 6.5 liters of distilled water. To this solution was added a mixture of 500 grams of distilled water and 7.5 grams of $FeSO_4 \cdot 7H_2O$. Finally a solution containing 263 grams of concentrated $NH_4OH$, 500 ml of distilled $H_2O$, and 54 grams of $(NH_4)_6H_2W_{12}O_{40} \cdot xH_2O$ was added dropwise to the iron/zirconium solution over a 30–45 minute period. The pH of the final composite was adjusted to approximately 9 by the addition of concentrated ammonium hydroxide. The synthesis composition, in terms of the Zr/W/Fe molar ratios, was 7.1/1/0.12. This slurry was then put in polypropylene bottles and placed in a steambox (100° C.) for 72 hours. The product formed was recovered by filtration, washed with excess water, and dried overnight at 85° C. A sample of this catalyst was calcined at 830° C. in flowing air for 3 hours; the surface area was 63 m g. The chemical analyses of the calcined material were: Fe, 0.72% (by weight); W, 14.8%; Zr, 54.5%; balance, oxygen; Ash (1000° C.) 96.7%.

Example 5

Five hundred grams of $ZrOCl_2 \cdot 8H_2O$ were dissolved with stirring in 5.5 liters of distilled water. To the zirconyl chloride solution was added a mixture of 6.7 grams of $CuSO_4 \cdot 5H_2O$, 7.5 grams of $FeSO_4 \cdot 7H_2O$, and 54 grams of $(NH_4)_6H_2W_{12}O_{40} \cdot xH_2O$ dissolved in 1500 ml of distilled water. A solution containing 263 grams of concentrated $NH_4OH$ and 500 ml of distilled $H_2O$ was added dropwise over a 30–45 minute period. The pH of the final composite was adjusted to approximately 9 by the addition of concentrated ammonium hydroxide. The synthesis composition, in terms of the Zr/W/Fe/Cu molar ratios, was 7.1/1/0.12/0.12. This slurry was then put in polypropylene bottles and placed in a steambox (100° C.) for 72 hours. The product formed was recovered by filtration, washed with excess water, and dried overnight at 85° C. Samples of this catalyst were calcined at 600, 700, and 830° C. in flowing air for 3 hours; the surface areas of the samples were 105; 94; and 7 $m^2/g$, respectively. The chemical analyses of the 830° C. calcined material were: Cu, 0.82% (by weight); Fe, 0.69%; W, 16.5%; Zr, 56.2%; balance, oxygen; Ash (1000° C.) 99.3%.

Example 6

Five hundred grams of $ZrOCl_2 \cdot 8H_2O$ were dissolved with stirring in 6.0 liters of distilled water. To the zirconyl chloride solution was added a mixture of 25.8 grams of $CuSO_4 \cdot 5H_2O$ and 54 grams of $(NH_4)_6H_2W_{12}O_{40} \cdot xH_2O$ dissolved in 1500 ml of distilled water. A solution containing 263 grams of concentrated $NH_4OH$ and 500 ml of distilled H$_2$O was added dropwise over a 30–45 minute period. The pH of the final composite was adjusted to approximately 9 by the addition of concentrated ammonium hydroxide. The synthesis composition, in terms of the Zr/W/Cu molar ratios was 7.1/1/0.5. This slurry was then put in polypropylene bottles and placed in a steambox (100° C.) for 72 hours. The product formed was recovered by filtration, washed with excess water, and dried overnight at 85°. Samples of this catalyst were calcined at 500, 600, and 700 in flowing air for 3 hours; the surface areas of the samples were 213; 73; and 43 m$^2$/g, respectively. The copper content is a nominal 3%.

Example 7

0.020 g of Cu(NO$_3$)$_2$·2.5 H$_2$O was dissolved into 0.391 g of water; the resulting solution was added to 1.022 g of Example 1 with constant mixing. The ratio of solution to catalyst was chosen to yield an incipiently wet material. The catalyst was calcined for two hours at 500° C. in flowing air. Chemical analysis indicated 0.55 wt. % Cu.

Example 8

0.332 g of Cu(NO$_3$)$_2$·2.5 H$_2$O was dissolved into 5.413 g of water; the resulting solution was added to 12.016 g of Example 2 that had not been previously calcined, with constant mixing. The ratio of solution to catalyst was chosen to yield an incipiently wet material. The catalyst was calcined for two hours at 600° C. in flowing air. Chemical analysis indicated 0.75 wt. % Cu.

Figure 1:
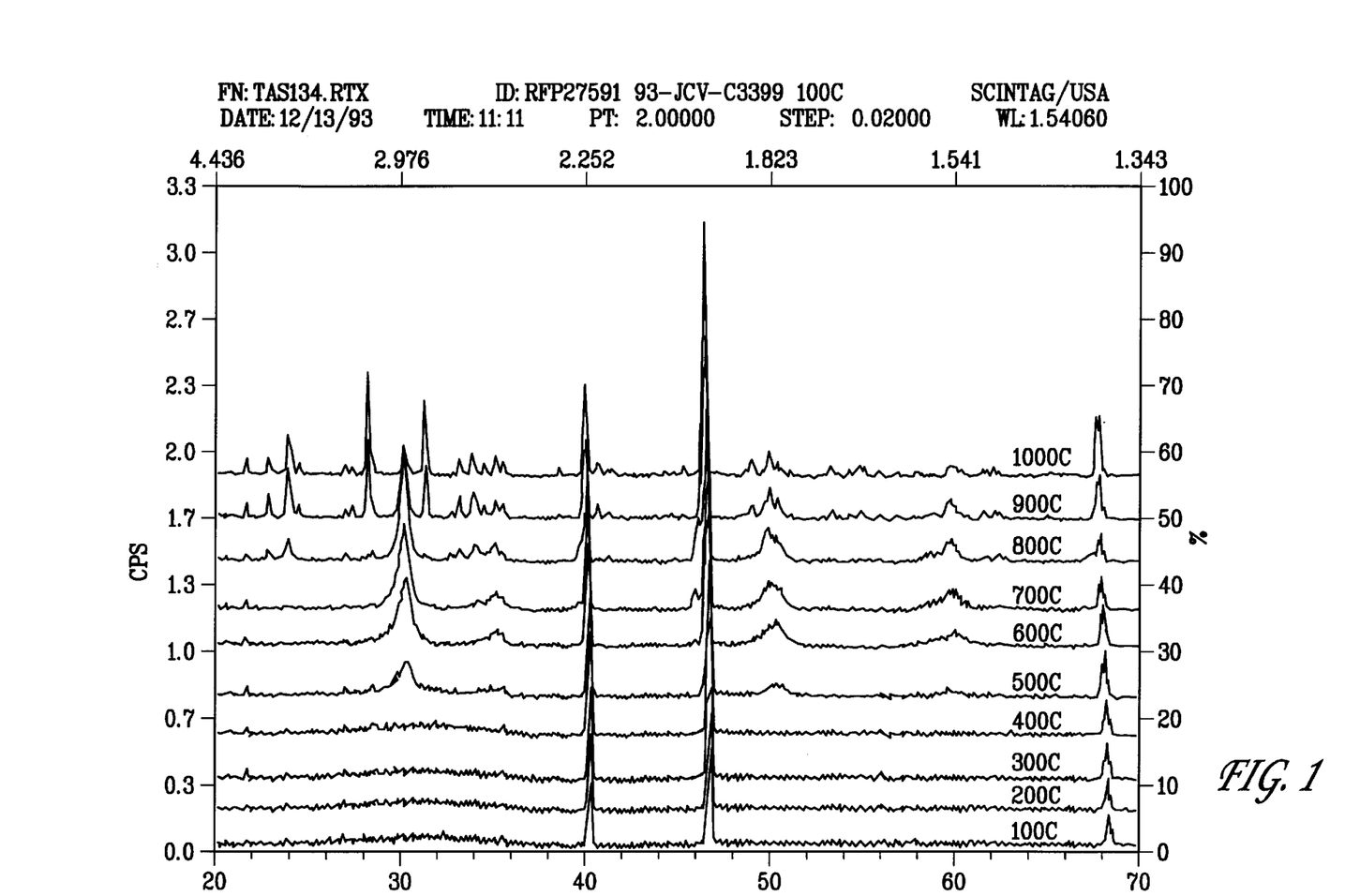
FIG. 1 are X-ray diffraction patterns that illustrate the phase transformations that occur for the $WO_x/ZrO_2$ catalyst of Example 1, as a function of calcination temperatures varying from 100° to 1000° C.

X-ray diffraction patterns as a function of calcination temperatures of Examples 1, 3, and 5 are shown in FIGS. 1–4. FIG. 1 illustrates the phase transformations that occur for the WO$_x$/ZrO$_2$ catalyst of Example 1 during a thermal treatment in air from 100° to 1000° C. Up to a temperature of ~500° C. the catalyst is essentially amorphous. At temperatures above 500° C. the formation of the tetragonal phase of zirconia is evident as indicated by the presence of a broad peak at approximately 30–32° 2θ. As the temperature increases the peak associated with the tetragonal phase grows in intensity and narrows suggesting the formation of larger crystallites. At temperatures above 800° C., the X-ray diffraction pattern shows evidence of the formation of WO$_3$ as indicated by the peaks at ~22–26° 2θ, and the appearance of the monoclinic phase of zirconia as indicated by the presence of two peaks located at ~30 and 33° 2θ. The intensity of the peak associated with the tetragonal phase decreases with increasing temperature and with the appearance of the monoclinic phase. Finally the transformation from the tetragonal phase to the monoclinic phase is almost complete at calcination temperatures above 900° C. Typically amorphous materials and materials having large amounts of the monoclinic phase exhibit less acid activity.

Figure 2:
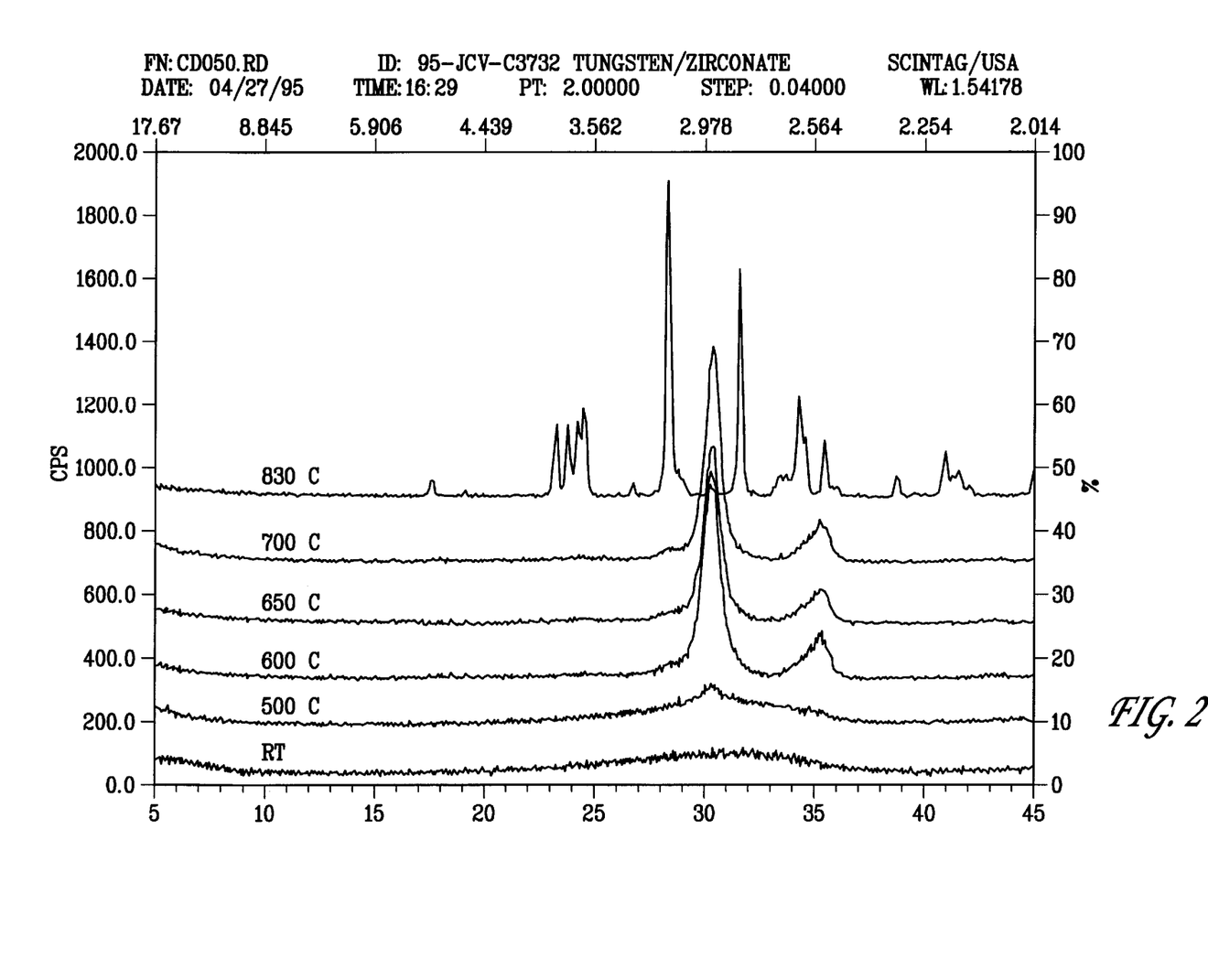
FIGS. 2 and 3 are X-ray diffraction patterns that illustrate the phase transformations that occur for the $Cu/WO_x/ZrO_2$ catalyst of Example 3, as a function of varying calcination temperatures.
Figure 3:
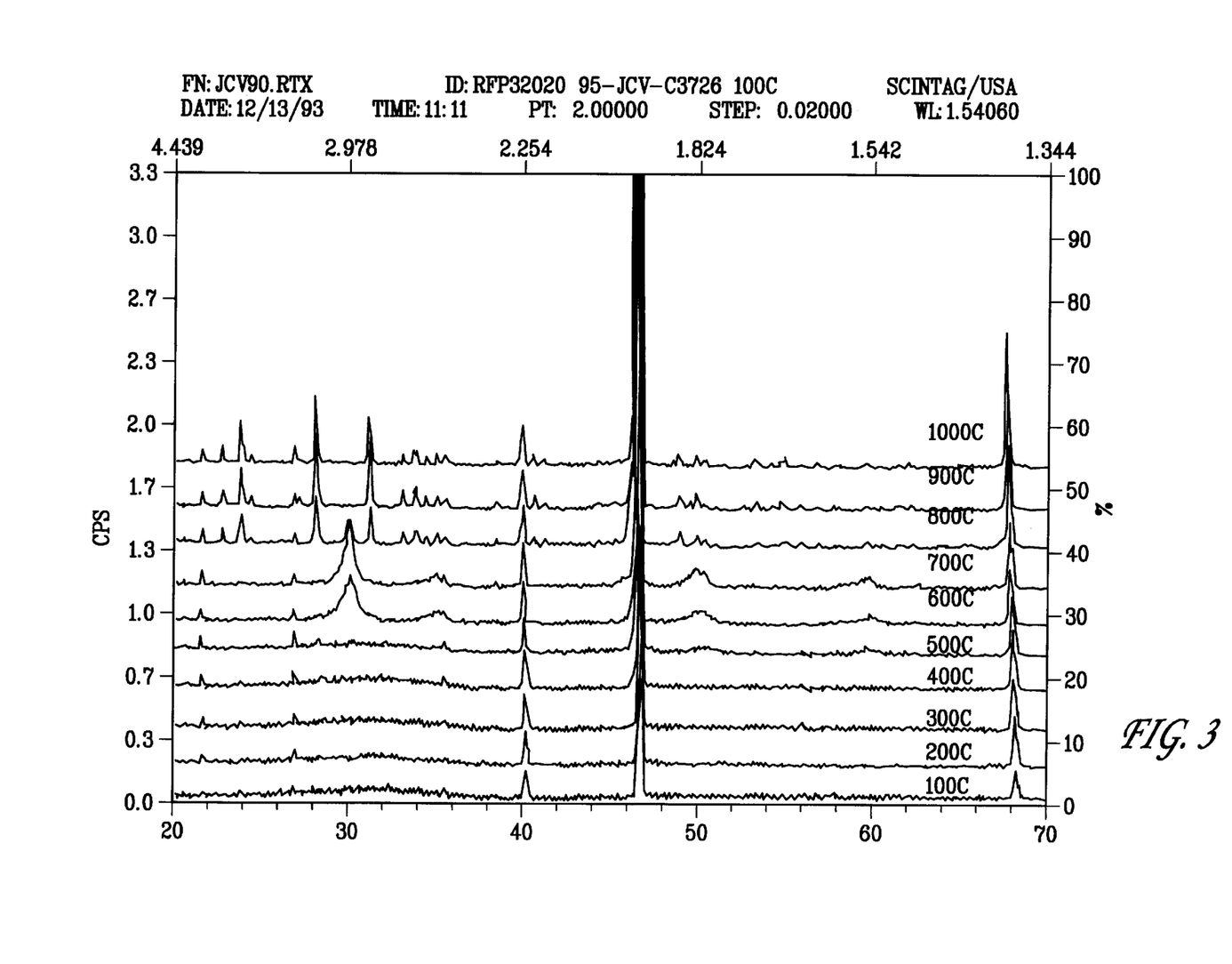

FIGS. 2 and 3 illustrate the phase transformations that occur with the addition of copper to the WO$_x$/ZrO$_2$ catalyst of Example 3. The presence of the tetragonal phase of zirconia is evident at temperatures of 500° and 600° C., similar to that of the copper free material. However, at 800° C. the monoclinic phase is the predominant phase. Thus, the transformation from the tetragonal phase to the monoclinic phase occurs at a lower temperature with the addition of copper.

Figure 4:
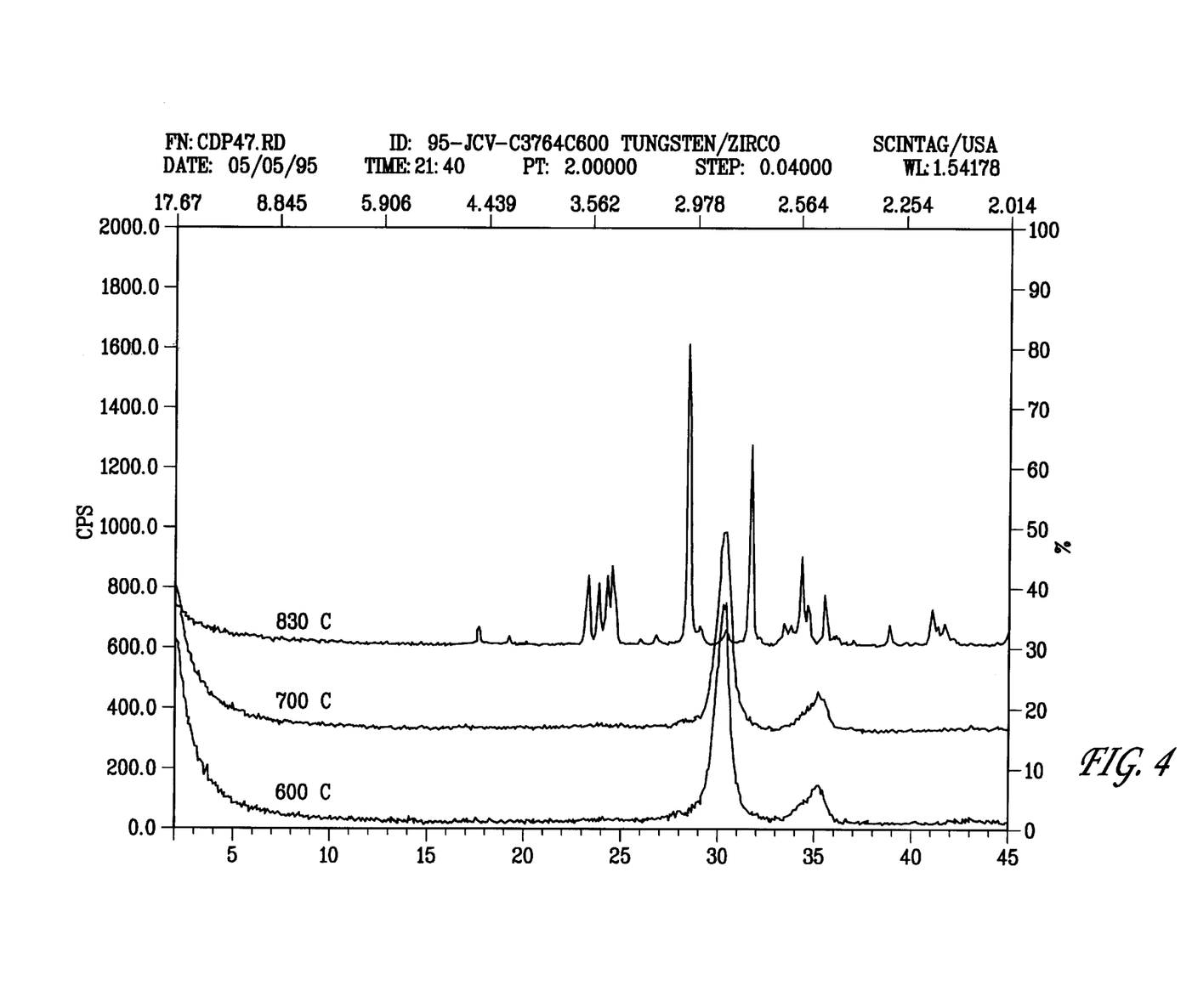
FIG. 4 are X-ray diffraction patterns that illustrate the phase transformations that occur for the Cu/Fe/W/Zr catalyst system of Example 5, as a function of varying calcination temperatures.

FIG. 4 illustrates the similar phase transformation behavior with respect to temperature for the Cu/Fe/W/Zr catalyst of Example 5. The presence of the monoclinic phase as the dominant phase at 830° is consistent with the data presented for the Cu/W/Zr system.

The catalysts of Examples 1–5 were tested for pentane isomerization activity in a fixed bed down-flow reactor at 350 psig, 2 more H$_2$/mole n-C$_5$, and 2 LHSV (cc n-C$_5$ feed per cc catalyst per hour) at various temperatures. The catalysts were calcined at 500° C. for one hour under flowing air prior to catalytic testing. The results are shown in Table I–III. The data in Table II illustrates that the copper-containing WO$_x$/ZrO$_2$ or Fe—WO$_x$/ZrO$_2$ catalysts demonstrate excellent isomerization activity when the calcination/activation temperature was as low as 600° C. (the surface area of the catalyst was 183 m$^2$/g when calcined at a temperature of 600° C., compared to a surface area of 10 m$^2$/g when calcined at 830° C.). In contrast, the copper-free WO$_x$/ZrO$_2$ catalyst required a calcination temperature of 830° C. to achieve comparable isomerization activity, and demonstrated very little pentane isomerization activity when calcined at temperatures at or below 700° C., as shown in Table I. The data presented in Table III demonstrates that the catalyst of the present invention, calcined at a temperature of 700° C., has an isomerization activity that is comparable to that of the copper-free WO$_x$/ZrO$_2$ catalyst calcined at a temperature of 830° C.

TABLE I

Pentane Isomerization Activity
2 LHSV, 2H$_2$/n-C$_5$ mol ratio, and 350 psig

| Catalyst Sample | Example 1 | Example 2 |
|---|---|---|
| Calcination Temp., ° C. | 830 | 700 |
| Reaction Temp., ° C. | 210 | 210 |
| Products | | |
| C$_1$ + C$_2$ | 0.4 | 0.03 |
| C$_3$ | 0.4 | 0.02 |
| i-C$_4$ | 2.7 | 0.05 |
| n-C$_4$ | 0.2 | 0.02 |
| i-C$_5$ | 69.1 | 11.6 |
| n-C$_5$ | 26.5 | 88.1 |
| C$_6$+ | 0.6 | 0.2 |
| n-C$_5$ Conv. wt. % | 73.5 | 11.9 |
| i-C$_5$/total C$_5$'s wt. % | 72.3 | 11.6 |

TABLE II

Pentane Isomerization Activity
For Catalyst Sample Example 3
2 LHSV, 2H$_2$/n-C$_5$ mol ratio, and 350 psig

| Calcination Temperature, ° C. | 600 | 700 | 830 |
|---|---|---|---|
| Reaction Temperature, ° C. | 200 | 200 | 200 |
| Products | | | |
| C$_1$ + C$_2$ | 0.1 | 0.5 | 0 |
| C$_3$ | 0.1 | 0.5 | 0 |
| i-C$_4$ | 0.7 | 2.0 | 0.02 |
| n-C$_4$ | 0.1 | 0.3 | 0 |
| i-C$_5$ | 63.6 | 69.4 | 2.7 |
| n-C$_5$ | 34.2 | 26.0 | 97.2 |
| C$_6$+ | 0.9 | 1.6 | 0.1 |
| n-C$_5$ Conv. wt. % | 65.8 | 74.0 | 2.8 |
| i-C$_5$/total C$_5$'s wt. % | 65.0 | 72.8 | 2.7 |

TABLE III

Pentane Isomerization Activity
2 LHSV, 2H$_2$/n-C$_5$ mol ratio; and 350 psig

| Catalyst Sample Calcination Temp., °C. | Example 4 830 | | Example 5 700 | |
| --- | --- | --- | --- | --- |
| Reaction Temperature, °C. | 190 | 200 | 190 | 200 |
| Products | | | | |
| C$_1$ + C$_2$ | 0.5 | 0.7 | 0.04 | 0.05 |
| C$_3$ | 0.4 | 0.6 | 0.1 | 0.2 |
| i-C$_4$ | 1.2 | 1.9 | 0.8 | 1.8 |
| n-C$_4$ | 0.3 | 0.4 | 0.2 | 0.3 |
| i-C$_5$ | 70.5 | 69.3 | 71.0 | 69.5 |
| n-C$_5$ | 25.8 | 24.9 | 26.5 | 25.1 |
| C$_6$+ | 1.4 | 2.1 | 1.3 | 2.9 |
| n-C$_5$ Conv. wt. % | 74.2 | 75.1 | 73.5 | 74.9 |
| i-C$_5$/total C$_5$'s wt. % | 73.2 | 73.6 | 72.8 | 73.5 |

From the data, it is clear that the incorporation of small amounts of Group IB metal or metal oxide with an acidic solid oxide component reduces the calcination temperature required for the generation of acid sites in a catalyst. Hence, the acid activity of a catalyst can be maximized at lower calcination temperatures, without reducing its surface area.

What is claimed:

1. An acidic solid oxide catalyst consisting of (i) an oxide of a Group IVB metal selected from the group consisting of zirconium and hafnium that is modified with an anion or oxyanion of a Group VIB metal, and (ii) a Group IB metal or an oxide of a Group IB metal.

2. The acidic solid oxide catalyst according to claim 1, wherein the Group IVB metal is zirconium; the Group VIB metal is tungsten; and the Group IB metal is copper.

3. The acidic solid oxide catalyst according to claim 1, wherein the Group IVB metal is zirconium; the Group VIB metal is tungsten; and the Group IB metal is silver.

4. The acidic solid oxide catalyst according to claim 1, where the calculated molar ratio of the Group IVB metal to the Group VIB metal, expressed in terms of XO$_2$ and YO$_3$, respectively, in the ratio XO$_2$/YO$_3$, is up to 1000, and the atomic ratio of Group IB metal to Group IVB metal is from about 0.0001 to 0.5.

5. An acidic solid oxide catalyst consisting of (i) an oxide of zirconium that is modified with an anion or an oxyanion of tungsten (ii) copper or an oxide of copper and (iii) an iron or manganese component, wherein the calculated molar ratio of zirconium to tungsten, expressed in terms of XO$_2$ and YO$_3$, respectively, in the ratio XO$_2$/YO$_3$, is up to 1000, the calculated molar ratio of zirconium to iron and/or manganese, expressed in terms of XO$_2$, Fe$_2$O$_3$ and MnO$_2$, respectively, in the ratio XO$_2$/(Fe$_2$O$_3$+MnO$_2$), is from 10 to 500, and the atomic ratio of copper to zirconium is from about 0.0001 to 0.5.

6. The acidic solid oxide catalyst according to claim 5, where the calculated molar ratio of zirconium to tungsten, expressed in terms of XO$_2$ and YO$_3$, respectively, in the ratio XO$_2$/YO$_3$, is from 2 to 100, the calculated molar ratio of zirconium to iron and/or manganese, expressed in terms of XO$_2$, Fe$_2$O$_3$ and MnO$_2$, respectively, in the ratio XO$_2$/(Fe$_2$O$_3$+MnO$_2$), is from 10 to 500, and the atomic ratio of copper to zirconium is from about 0.01 to 0.3.

7. An acidic solid oxide catalyst consisting of (i) an oxide of zirconium that is modified with an anion or an oxyanion of tungsten (ii) copper or an oxide of copper, (iii) an iron or manganese component and (iv) a hydrogenation/dehydrogenation component.

8. A method for preparing an acidic solid oxide catalyst consisting of (i) an oxide of a Group IVB metal selected from the group consisting of zirconium and hafnium that is modified with an anion or oxyanion of a Group VIB metal, and (ii) a copper component, the method comprising the step of co-precipitating a source of the Group IVB metal oxide, a source of the oxyanion of a Group VIB metal, and a source of the copper component.

9. The method for preparing an acidic solid oxide catalyst according to claim 8, where the acidic solid oxide catalyst is co-precipitated at a temperature of about 50° to 100° C.

10. The method for preparing an acidic solid oxide catalyst according to claim 8, further comprising the step of calcining the coprecipitated product at a temperature of from 500° to 800° C.

* * * * *